US006802028B1

United States Patent
Ruff et al.

(10) Patent No.: US 6,802,028 B1
(45) Date of Patent: Oct. 5, 2004

(54) COMPUTER VIRUS DETECTION AND REMOVAL

(75) Inventors: Eric J. Ruff, Lehi, UT (US); Robert S. Raymond, Orem, UT (US)

(73) Assignee: PowerQuest Corporation, Orem, UT (US)

(*) Notice: Subject to any disclaimer, the term of this patent is extended or adjusted under 35 U.S.C. 154(b) by 750 days.

(21) Appl. No.: 08/948,931

(22) Filed: Oct. 10, 1997

Related U.S. Application Data

(60) Provisional application No. 60/029,707, filed on Nov. 11, 1996.

(51) Int. Cl.[7] .................................................. G06F 11/00
(52) U.S. Cl. .............................. 714/38; 714/25; 714/28; 714/39
(58) Field of Search ............................ 714/38, 25, 28, 714/39

(56) References Cited

U.S. PATENT DOCUMENTS

| | | | |
|---|---|---|---|
| 5,121,345 A | 6/1992 | Lentz ........................ 364/550 |
| 5,278,901 A | 1/1994 | Shieh et al. .................... 380/4 |
| 5,349,655 A | 9/1994 | Mann ........................ 395/575 |
| 5,361,359 A | 11/1994 | Tajalli et al. ................ 395/700 |
| 5,367,682 A | 11/1994 | Chang ........................ 395/700 |
| 5,398,196 A | 3/1995 | Chambers .................... 364/580 |
| 5,408,642 A | 4/1995 | Mann ........................ 395/575 |
| 5,412,717 A | 5/1995 | Fischer ........................ 380/4 |
| 5,421,006 A | 5/1995 | Jablon et al. ................ 395/575 |
| 5,440,723 A | 8/1995 | Arnold et al. ............... 395/181 |
| 5,475,839 A | 12/1995 | Watson et al. .............. 395/650 |
| 5,485,575 A * | 1/1996 | Chess et al. ................... 714/38 |
| 5,509,120 A | 4/1996 | Merkin et al. .............. 395/186 |
| 5,511,184 A | 4/1996 | Lin ............................ 395/734 |
| 5,535,416 A | 7/1996 | Feeney et al. .............. 395/834 |
| 5,537,540 A | 7/1996 | Miller et al. ............ 395/183.14 |
| 5,559,960 A | 9/1996 | Lettvin ........................ 395/186 |
| 5,572,590 A | 11/1996 | Chess ............................ 380/4 |
| 5,623,600 A * | 4/1997 | Ji et al. ........................ 713/201 |
| 5,657,445 A * | 8/1997 | Pearce ........................ 713/200 |
| 5,675,711 A * | 10/1997 | Kephart et al. ............... 706/12 |
| 5,684,875 A * | 11/1997 | Ellenberger .................. 380/4 |
| 5,696,822 A | 12/1997 | Nachenberg .................. 380/4 |
| 5,765,030 A | 6/1998 | Nachenberg et al. .. 395/183.09 |
| 5,815,571 A * | 9/1998 | Finley ........................ 713/200 |
| 5,842,002 A * | 11/1998 | Schnurer et al. ............ 395/500 |
| 5,889,943 A * | 3/1999 | Ji et al. ........................ 713/201 |

OTHER PUBLICATIONS

"Artificial Immunity for Personal computers" IBM Technical Disclosure Bulletin, Jul. 1991 vol. 34 No.2, pp. 150–154.
Patent Search Results, "Detecting and Eliminating Stealth Computer Viruses".
"Software Anti–Virus Facility", PCT Gazette, No. 47/1996.
"Czech Anti–Virus Software Aimed At US Market", Newsbytes News Network (1995), Sep. 15, 1995.

(List continued on next page.)

Primary Examiner—Thomas Lee
Assistant Examiner—Chun Cao
(74) Attorney, Agent, or Firm—Thorpe North & Western LLP

(57) ABSTRACT

Methods and systems are provided for detecting viruses in a computer system without relying on possibly infected system software or a possibly infected standard BIOS. The invention uses a separate BIOS designed specifically for virus detection and removal. This trusted BIOS is tailored to the controller hardware. The invention can detect viruses by detecting inconsistencies between results returned by the standard BIOS and results obtained using the trusted BIOS. The invention may also provide a virus remover. The virus remover relocates facade structures to their proper location, reconstructs boot sectors and Master Boot Records, and otherwise removes viruses.

37 Claims, 4 Drawing Sheets

OTHER PUBLICATIONS

"New 'Dr. Solomon's Anti–Virus' To Ship", Newsbytes News Network (1995), Aug. 28, 1995.
"Reflex Plans Windows 95 Virus Scanner", Newsbytes News Network (1995), Jul. 5, 1995.
"UK –Sophos Intros Virus Scanner For Windows NT", Newsbytes News Network (1993), Aug. 22, 1994.
"Antivirus Software –Tale of Two AV Scanners", Barry Simon, *PC Magazine*, Dec. 17, 1996, pp. 52, 54.
"Limiting the Damage Potential of Discretionary Trojan Horses", Paul A. Karger, 1987 IEEE Symposium on Security and Privacy, IEEE (1987), pp. 32–37.
"A Multilevel File System for High Assurance", Cynthia E. Irvine, 1995 IEEE Symposium on Security and Privacy, pp. 78–87.
"A Proposal for a Verification–Based Virus Filter", Steve Crocker et al., 1989 IEEE Symposium on Security and Privacy, IEEE (1989), pp. 319–24.
"The Security Policy of the Secure Distributed Operating System Prototype", Norman Proctor et al., 1989 $5^{th}$ IEEE Computer Security Applications Conference, IEEE (1990), pp. 95–102.

"Trustable Computing in Next–Generation Avionic Architectures", James O. Bondi, 1992 $8^{th}$ IEEE Computer Security Applications Conference, IEEE (1992), pp. 10–19.
"USTAT: A Real–time Intrusion Detection System for UNIX", Koral Ilgun, 1993 IEEE Symposium on Security and Privacy, IEEE (1993), pp. 16–28.
"A Generic Virus Scanner in C++", Sandeep Kumar et al., 1992 $8^{th}$ IEEE Computer Security Applications Conference, IEEE (1992), pp. 210–19.
"A Fault Tolerant Approach To Computer Viruses", Mark K. Joseph et al., 1988 IEEE Symposium on Security and Privacy, IEEE (1988), pp. 52–57.
"A Comparison of Secure UNIX Operating Systems", Raymond M. Wong, 1990 $6^{th}$ IEEE Computer Security Applications Conference, IEEE (1990), pp. 322–33.
"A DOS–Based POset Implementation", Frederick B. Cohen, *Computers & Security*, vol. 10, No. 6 (1991), Elsevier Science Publishers Ltd. (1991), pp. 541–51.
"Defense–in–Depth Against Computer Viruses", Frederick B. Cohen, *Computers & Security*, vol. 11, No. 6 (1992), Elsevier Science Publishers Ltd. (1992), pp. 563–79.

* cited by examiner

COMPUTER VIRUS DETECTION AND REMOVAL

RELATED APPLICATIONS

The present application claims the benefit of commonly owned U.S. Patent Provisional Application Ser. No. 60/029,707 filed Nov. 11, 1996.

FIELD OF THE INVENTION

The present invention relates to the detection and removal of undesirable programs from computer systems.

TECHNICAL BACKGROUND OF THE INVENTION

Many computer users have encountered computer viruses, sometimes with painful results. Computer viruses can cause unrecoverable errors, delete files, create intermittent problems and otherwise cause individuals and businesses much frustration and other damage. As used herein, "computer virus" or "virus" means a computer program that is unauthorized and undesired, and which operates or propagates surreptitiously.

Some viruses can make copies of themselves. Some viruses can modify their own code, making them harder to identify and remove. A distinction is sometimes made between self-replicating viruses and another threat to system security, known as a "Trojan Horse." However, for purposes of this discussion a Trojan Horse program is considered to be a virus because it operates surreptitiously. A Trojan Horse is a program that has been designed or modified to perform some hostile act but is disguised as a familiar or non-threatening program. All viruses are capable of wasting time or otherwise adversely affecting the operation of an infected subject computer system. Certain viruses, known as "stealth viruses", hide behind a facade. That is, they manipulate an infected system to hide their presence by redirecting commands, relocating system structures, overwriting signatures, or other means.

An Overview of Computer Components and the Boot Process

Many computer viruses exploit the underlying mechanisms of the computer operating system. A better understanding of the ways viruses operate and propagate can be gained by considering the basic steps performed in starting a computer.

Computers include hardware, such as a keyboard, screen, memory, and disk drives. They also include system software, such as boot software, operating system software, and file system software. Boot software includes non-volatile programs used to load the initial program or operating system. Operating system software includes a wide variety of routines for tasks such as launching programs, managing memory, displaying windows, and enforcing security. File system software includes routines for organizing and accessing data on a disk or other persistent storage medium.

An interface is often provided between the hardware and the system software to enable programmers or users to program their machines with less detailed knowledge of a particular hardware device. In many personal computers, for example, a BIOS (Basic Input/Output System) disk module permits a programmer to operate a floppy disk drive (or a hard disk drive) without a thorough knowledge of the specific brand of drive hardware being used. Thus, a number of drives designed and manufactured by different companies can be used in the system. This not only lowers the cost of the system, but permits a user to choose from a number of drives with equal facility. The BIOS is typically stored in memory chips, such as read-only memory chips ("ROM").

The process of starting a computer is called "bootstrapping", often shortened to "booting", because a small piece of computer code is read and then used to load a larger program, which in turn loads additional programs. In a figurative way, the computer pulls itself up by its own bootstraps.

To start a computer, a small boot program stored in ROM is first executed. The ROM boot program contains at least three critical pieces of information, namely, the location on disk of a Master Boot Record ("MBR"), the starting address at which the MBR should be copied into memory, and instructions for making a copy of the MBR contents in memory and passing control of the processor to that copy. The MBR contains a disk boot program that will load the operating system code and eventually pass control to the command interpreter or other user interface. In theory, the ROM boot program and the disk boot program could be consolidated and stored in ROM, but this requires more expensive hardware and makes the computer less flexible. Indeed, the entire system software could be stored in ROM (at considerable expense) but any updates to the system software would require swapping in different ROM chips.

As used here, "boot sector" refers generally to the Master Boot Record or another location in persistent storage which contains at least part of the information used to boot the computer. Architectures other than IBM-PC-compatible architectures may use other names for the MBR, the BIOS, and other computer system components discussed here; the role played by a component is more important than the component's name. A boot sector is typically stored on a persistent medium, such as a hard disk or a floppy disk, at a fixed location such as the first, last, or middle sector of an entire disk or a disk partition. The boot sector may contain boot code, or it may refer to another location which contains boot code.

In some cases, a distinction is made between the MBR and other sectors that contain information used during the boot process. As used herein, the term "virus targets" refers to the MBR, to various boot sectors, and to other parts of a computer system which may be targeted by a virus. In general, virus targets contain low-level system information such as boot information, but some viruses target word processor macros or other information that is closer to the user/application level.

An Overview of Virus Methods

Viruses generally move from computer to computer using an infected portable storage medium, such a floppy disk or a removable hard drive, but they may also enter a system when code is downloaded over the Internet or another network. Viruses try to penetrate computers during the boot process, at or below the system software level, because that gives the viruses greater access to disks and other system resources and because anti-virus measures may not yet be running if the boot process has not finished.

Viruses try to penetrate the boot process in various ways. Stealth virus invasions modify operating system file access procedures by intercepting the procedure call and passing back incorrect information when the correct information would reveal the virus' presence. For instance, a virus can install itself in the Master Boot Record and then modify attempts to read the MBR so it appears that no virus is present. A virus may also create a facade MBR at a location other than the fixed location of the MBR, and fill the facade with the contents of the original MBR. Any anti-virus checks on the MBR to determine its integrity through checksums or data values will be intercepted and performed on the facade instead of the actual modified MBR, so the invasion will go undetected.

A similar trick may be performed on other boot sectors or even on sectors that contain macros created by a user. That is, one or more of the virus target sectors are modified and copies of the original sectors are stored elsewhere. Legitimate calls to read or write a sector are intercepted, and passed to the facade sector to avoid detection of the unauthorized modifications.

Because working portions of the BIOS or references to the BIOS are often stored in modifiable random access memory ("RAM"), another virus method alters the copy of BIOS or BIOS reference in RAM. A virus may also intercept parameters which specify BIOS activities and pass back false information.

An Overview of Virus Detection and Removal

Many methods have been developed to discover and remove viruses. Three of the most common methods currently employed to protect against viruses are known as "scanner", "self-test", and "vaccination" methods.

Scanner methods check for known viruses by looking for identifying sections of virus code in system files, in boot sectors, and in memory. Although scanning works well on some known viruses, it is less effective or even useless on viruses that modify their own code because the scanner will not find the modified code fragments. Scanning also becomes less effective as time passes and the pool of new and enhanced viruses grows, even if the scanners are periodically updated. Scanning methods also fail when a stealth virus successfully uses a facade to trick detection efforts that rely on reading the targeted sectors. The facade is scanned instead of the actual infected sectors, so the virus goes undetected.

Self-test methods perform a checksum on the virus target, and compare the results with an original checksum value that has been previously calculated on the virus target known to be uninfected and then stored out of reach of the virus. These methods are also vulnerable to facade records, because the virus detection software read is diverted, and the checksum is calculated on the uninfected (but relocated) virus target. The virus remains undisturbed in the location intended to hold the virus target.

Another method used by viruses to circumvent self-test methods infects the virus target in such a way as to produce the same checksum as the original unmodified virus target. The virus can do this by filling particular spaces in the infected virus target with appropriate data.

Vaccination methods make it appear to the virus that the system is already infected. This virus prevention method has many of the same problems as the scanner method, and works best for known viruses.

To remove a computer virus it is often necessary to have a clean, uninfected disk, so the MBR or other infected sectors can be overwritten with their uninfected versions without intervention by the virus. Because viruses easily infect all available disks (including anti-virus disks!), clean disks can be hard to find.

Thus, it would be an improvement in the art to provide a virus detection system and method that do not depend solely on the computer operating system or BIOS to detect viruses.

It would be a further improvement in the art to provide a virus removal system and method that do not require a clean uninfected disk to work.

Such a system and method are disclosed and claimed herein.

BRIEF SUMMARY OF THE INVENTION

The present invention provides a virus detection system and method that do not depend on the system software or the standard BIOS to detect viruses. In conventional systems, viruses alter the path between application programs and storage media In an IBM-compatible system using the MS-DOS operating system, for instance, disk reads requested by an application are serviced by a BIOS routine; a stealth virus hides its presence by modifying the BIOS or BIOS references to redirect attempts to read the MBR (MS-DOS is a registered trademark of Microsoft Corporation). The invention provides an alternate path to the disk (or other storage medium) by providing an alternate BIOS or other means for translating between application access requests and storage media hardware. The alternate path provided by the invention is more trustworthy than the standard path because the alternate BIOS is not readily accessible to viruses. Viruses can be detected by noting differences between results obtained using the infected standard BIOS and the uninfected alternate BIOS.

In one embodiment, a computer system according to the invention includes a storage subsystem containing a storage medium and a controller; the controller has a controller interface for controlling access to the storage medium. Possible storage media include magnetic storage media, optical storage media, and other computer storage media. Possible controllers thus include hard disk controllers, floppy disk controllers, and other hardware/firmware storage media controllers.

The invention uses a trusted translation means for translating between logical requests for access to the storage medium and corresponding parameters used in the controller interface, such as a trusted BIOS. Thus, the invention does not depend on the possibly infected system software or the possibly infected BIOS to detect viruses. Instead, the invention uses a separate BIOS designed specifically for virus detection and removal. Like the standard BIOS, this alternate BIOS is tailored to the controller hardware. Unlike the standard BIOS, this alternate BIOS is trusted because it has been protected against infestation by being kept inaccessible to viruses.

A method of the invention includes a detecting step. During the detecting step virus detection software according to the invention searches for viruses, focusing on selected targets but not necessarily limiting all activity to those targets. Selected targets include the controller hardware state, the Master Boot Record, and boot sectors which are not part of the Master Boot Record. The detecting step may detect an altered interrupt vector, detect alteration of a BIOS parameter, and/or detect a facade system structure. The detection means can be applied locally or across a network communications link.

Some embodiments of the invention include both a virus detector and a virus remover. The virus remover relocates facade structures to their proper location, reconstructs boot sectors and Master Boot Records, and otherwise removes viruses. The removal steps used may depend on the type of virus detected. If a facade Master Boot Record or facade boot sectors are discovered, then they may be relocated or they may be reconstructed in their proper location using redundant data.

Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings.

DETAILED DESCRIPTION OF THE PREFERRED EMBODIMENTS

The present invention relates to a system and method for detecting and possibly removing a computer virus. The virus may be destructive or merely inconvenient; targeted at system or application files; removable or merely detectable by the invention; and previously known or newly identified. The invention may be used with standalone, networked or disconnectable mobile computers, including workstations, laptops, desktops, palmtops, servers, mainframes, embedded computers, or other computers, as well as with combinations of such computers. The computers may be connected to, or merely connectable to, a local area network, a wide-area network, the Internet, an intranet, a peer-to-peer network, or a combination thereof.

Figure 1:
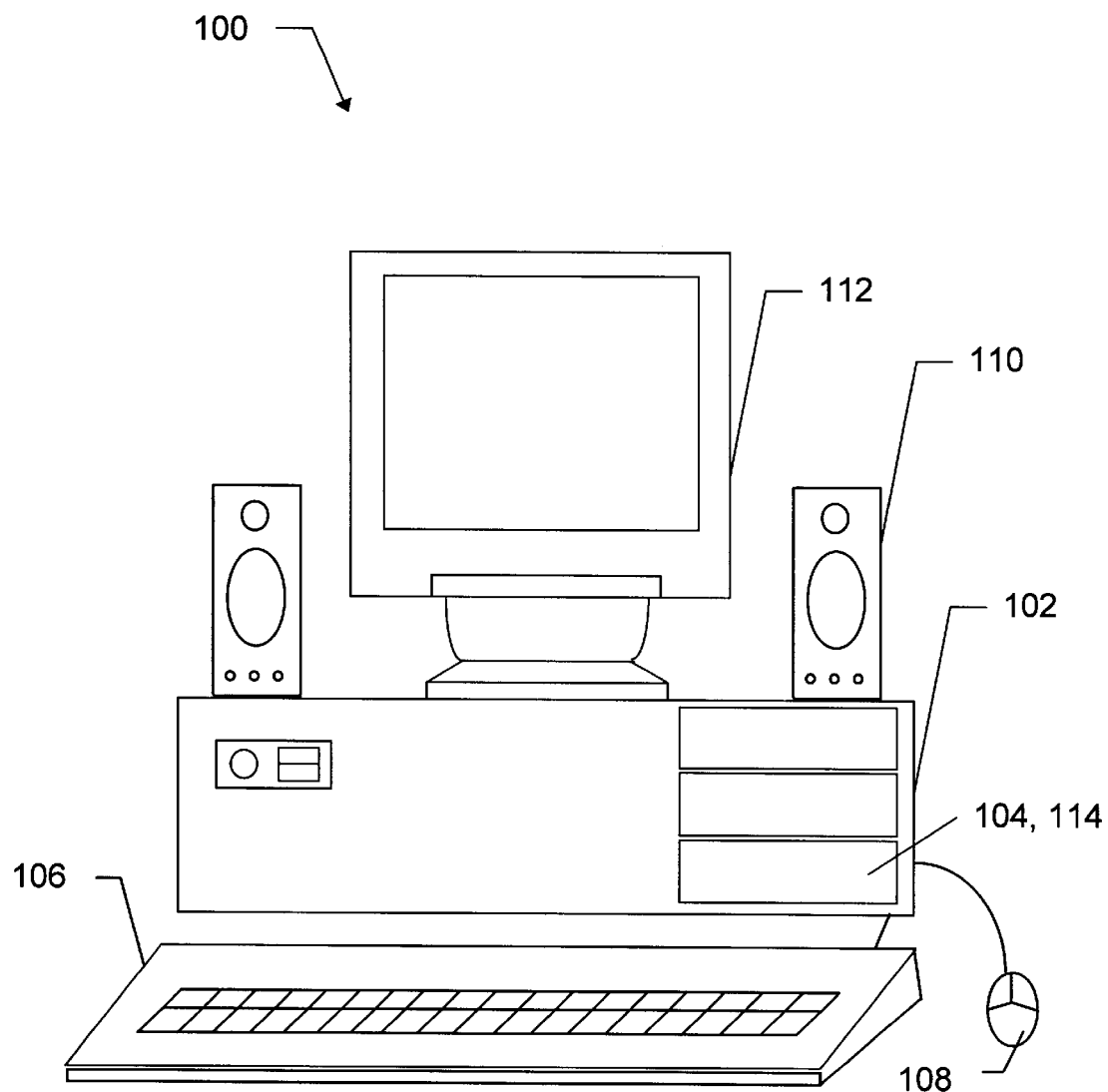
FIG. 1 shows a computer which is one of the many computer systems suitable to be configured according to the present invention.

A personal computer 100 configured according to the invention is illustrated in FIG. 1. The computer system 100 includes a system unit 102 containing a processor, memory (ROM and RAM), and a storage subsystem 104. The computer 100 also includes a keyboard 106, a mouse 108, a sound subsystem 110, and a monitor 112. Although a so-called IBM-PC computer is illustrated, the invention is useful with computers manufactured by a variety of manufacturers, including IBM, Apple, Sun, Apollo, Digital, Hewlett-Packard, Silicon Graphics, Dell, Gateway, and many others (these trademarks are the property of the respective companies).

The computer 100 and other computers configured according to the invention are capable of using floppy drives, tape drives, optical drives, magnetic drives, magneto-optical drives or other means to read a storage medium 114. A suitable storage medium 114 includes a magnetic, optical, or other computer-readable storage device having a specific physical substrate configuration. Suitable storage devices include floppy disks, hard disks (with fixed or removable media), tape, CD-ROMs, PROMs, electrically erasable programmable ROMs ("EEPROMs"), flash ROMs, random access memory, and other computer system storage devices. The substrate configuration represents data and instructions which cause the computer system to operate in a specific and predefined manner as described herein. Thus, the medium 114 tangibly embodies a program, functions, and/or instructions that are executable by the computer 100 and possibly other computers to perform virus detection and removal substantially as described herein.

The medium 114 may be part of the same storage subsystem 104 that is scanned for viruses, but it need not be. In some embodiments the medium 114 is located in another computer and the virus detection software is sent over a network link from a server to the RAM of the computer 100. Suitable software for implementing the invention is readily provided by those of skill in the art using the teachings presented here and programming languages such as Java, Pascal, C++, C, assembly, firmware, microcode, and/or other languages.

Figure 2:
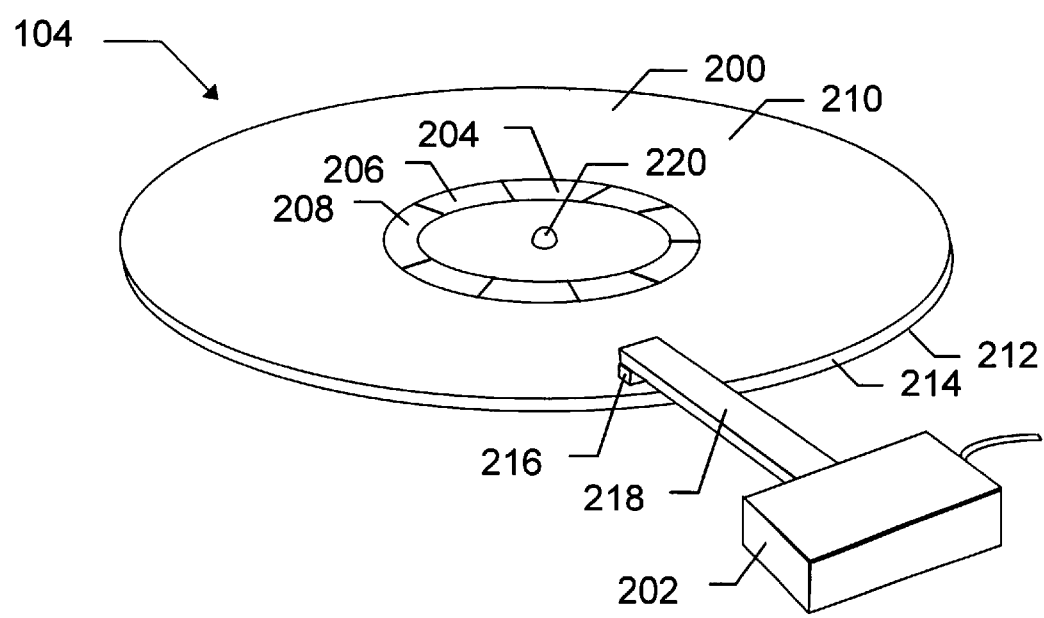
FIG. 2 shows part of a disk drive located in the computer of FIG. 1.

FIG. 2 further illustrates the storage subsystem 104. The subsystem 104 includes a disk 200 attached to a disk drive 202. The disk 200 illustrates physical characteristics of both floppies and hard disks. The disk 200 contains a number of concentric data cylinders such as the cylinder 204; some disks use data spirals instead of data cylinders. The cylinder 204 contains several data sectors, including sectors 206 and 208. The sectors 206 and 208 are located on an upper side 210 of the disk 200; additional sectors may be located on a lower side 212 of the disk 200. The sides 210 212 of the disk 200 define a platter 214. Floppy disks contain only one platter and thus are either single-sided or double-sided. For clarity of illustration only one platter 214 is shown in FIG. 2, but hard disks often contain several platters and thus may include one, two, or more sides.

The upper side 210 of the disk 200 is accessed by a head 216 mounted on an arm 218 secured to the drive 202. To access different cylinders of the disk 200, the arm 218 moves the head 216 in toward the center of the disk 200 or out toward the periphery of the disk 200 according to the position of the desired cylinder. To access different sectors within a cylinder, the drive 202 rotates the disk 200 around a spindle 220, thereby rotating the desired sectors into adjacency with the head 216. Additional sides of a disk, including sides on additional platters, may be accessed in a similar manner by additional disk drive heads. Because each side of a disk is accessed by a corresponding disk drive head, the number of heads is sometimes used to indicate the number of sides of the disk that are accessible to the drive. For example, double-sided disks are accessed with double-headed drives.

A given sector on the disk 200 may be identified by specifying a head, a cylinder, and a sector within the cylinder. A triplet specifying the head number, cylinder number, and sector number in this manner is known as a "physical sector address." Alternatively, a given sector may be identified by a "logical block address" ("LBA"). Each LBA is a single number rather than a triplet of numbers. The LBA address of a sector corresponds to the number of sectors between the addressed sector and the "first" sector on the disk 200 along some specified path which traverses all available sectors in order.

Disks are also classified by rules governing the physical organization of data on the disk. Many disks mold the available space into one or more "partitions" by a "partition table" located on the disk. The position of the boot information is often fixed in a given partition. For instance, the boot information may be stored in one or more of the first sectors of the partition. Different partition table compositions are almost as common as different operating systems and different file systems, which number in the hundreds. Partition tables, Master Boot Records, and boot sectors are among the system structures which may be targeted for modification or replacement by viruses.

In a system 100 using an IBM-compatible partition table, a system indicator identifies the type of file system contained in the partition, which in turn defines the physical arrangement of data that is stored in the partition on the disk 200. The system indicator utilizes predefined constant values to designate various file systems. For instance, the constant value 01H indicates a 12-bit File Allocation Table ("FAT") file system first used by the MS-DOS operating system. Other values designate other file systems; values not recognized by a particular operating system are treated as designating an unknown file system.

The system indicator may designate a file system which is used most widely in connection with a particular operating system. However, operating systems and file systems are different components of the computer. The file system associated with a specific partition of the disk 200 determines the format in which data is stored in the partition, namely, the physical arrangement of user data and of file system structures in the portion of the disk 200 that is delimited by the partition in question. At any given time, each partition contains at most one type of file system.

The operating system manages access, not only to the disk 200, but to other computer resources as well. Resources typically managed by the operating system include one or more disks and disk drives, memory elements (RAM and/or ROM), microprocessors, and I/O devices such as the keyboard 106, mouse 108, screen 112, a printer, a tape drive, a modem, a serial port, a parallel port, or a network port.

The operating system accesses the disk 200 in part through subprograms known as "file system drivers." These drivers use internal file system data and assumptions about the file system to translate more abstract information such as file names and read/write requests into more detailed information such as sector addresses and physical disk accesses. By appropriate use of file system drivers, a single operating system can access files stored according to different file systems.

Conventional file system drivers, other file system software, BIOS software, and operating system software are collectively known herein as "system software" to distinguish them from software according to the present invention. This terminology is used to clarify discussion of the invention, and does not rule out the possibility of modifying conventional system software to include virus detection and/or removal software according to the invention.

To overcome limitations imposed by conventional virus discovery and removal methods, the present invention provides a virus detection system and method that do not depend on the possibly infected system software to detect viruses. Instead, the invention uses a separate BIOS designed specifically for virus detection and removal.

Figure 3:
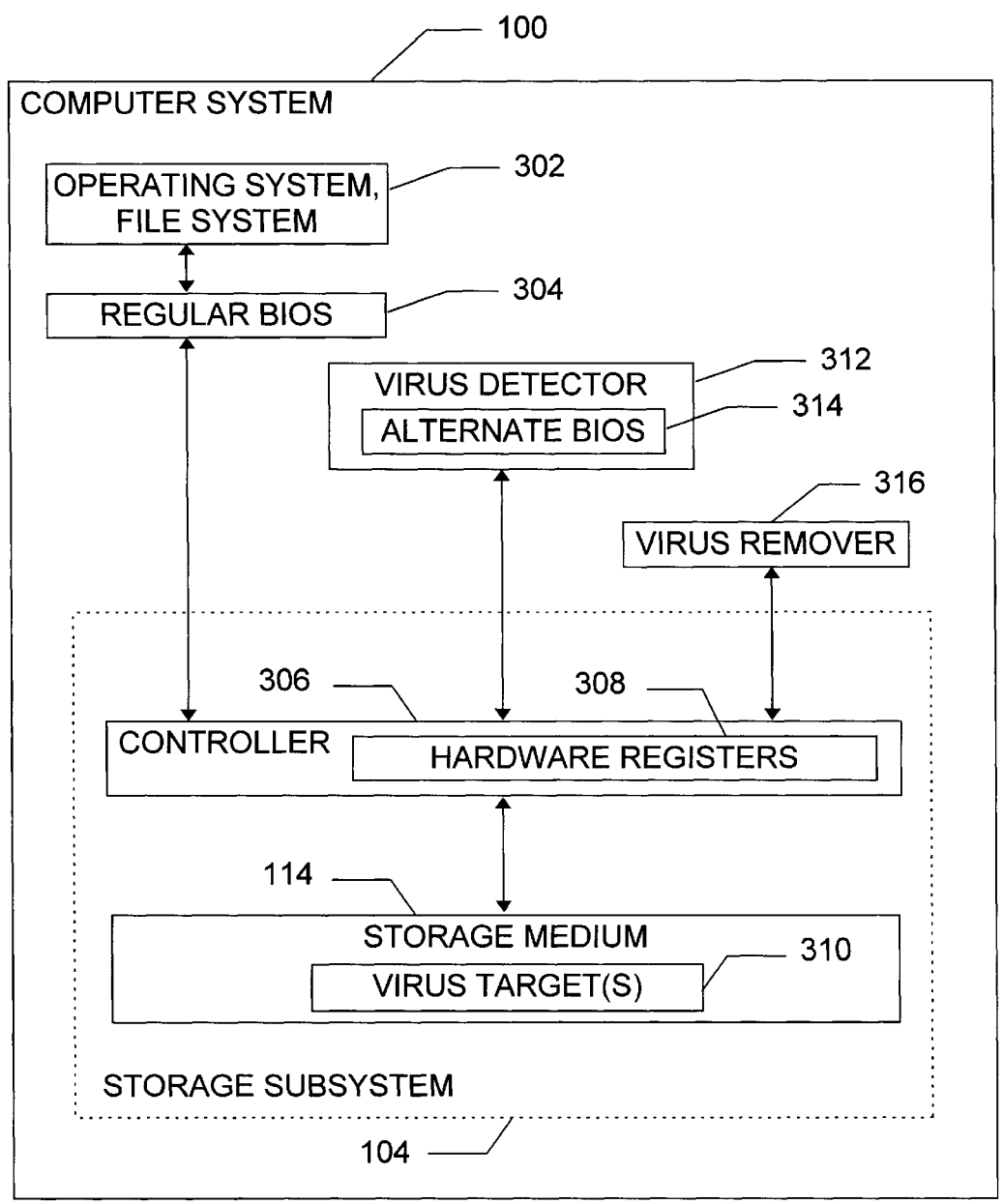
FIG. 3 is a block diagram further illustrating the computer of FIG. 1 as configured according to the present invention.

The system 100 configured according to one variation of the invention is illustrated in FIG. 3. The illustrated embodiment includes conventional system software 302 which uses a conventional BIOS 304 to interface with the storage subsystem 104. The storage subsystem 104 contains a storage medium 114 and a controller 306. The controller includes hardware registers 308. Suitable storage subsystem 104 devices include floppy disk drives, hard disk drives (with fixed or removable media), tape drives optical drives, magneto-optical drives, and other computer storage devices. The storage medium 114 holds a virus target 310 such as a Master Boot Record, one or more boot sectors, or other target structures which are vulnerable to a virus infection.

The storage medium 114 is normally accessed through the controller 306 under the direction of the regular BIOS 304. The BIOS 304 translates between operating system and file system call parameters, on the one hand, and values placed in the hardware registers 308 or memory, on the other hand.

More precisely, the BIOS 304 and other BIOS components accept device-independent and/or manufacturer-independent requests from the system software 302, translate these requests into instructions which are compatible with particular devices or device families, and directs the controller 306 to operate on the storage medium 114 accordingly by placing the instructions in the registers 308. BIOS components also accept result values, such as error codes, from the controller registers 308 and translate those values into results which can be used in the system software 302.

In addition to the registers 308, portions of RAM may be directly controlled by the BIOS and the controller 306 through Direct Memory Access ("DMA") operations. For instance, DMA may be used to transfer one or more sectors of data to or from the storage medium 114. The term "BIOS" is used generically here to refer to such translation code, and is not limited to implementations in ROM in IBM-compatible machines. The BIOS may be located in the operating system and/or in file system drivers rather than being stored separately in ROM. For instance, some versions of Windows NT system software make a separate BIOS unnecessary (WINDOWS NT is a mark of Microsoft Corporation).

The system 100 also includes a virus detector 312 which does not rely on the BIOS 304 used by the system software 302. Instead, the virus detector 312 uses a separate, trusted BIOS 314. Like the regular BIOS 304, this alternate BIOS 314 must be tailored to the controller hardware 306. However, the functionality provided by the trusted BIOS 314 can often be a subset of the functionality provided by the regular BIOS 304, since many BIOS routines needed by the system software 302 are not required by the virus detector 312. For instance, one embodiment of the trusted BIOS 314 contains no keyboard, serial port, parallel port, or keyboard routines.

The virus detector 312 reads the registers 308 directly rather than relying on the information passed to it by the native BIOS 304. This allows the virus detector 312 to find viruses that alter copies of the BIOS 304, that alter interrupt vectors used by the BIOS 304, that intercept calls from the system software 302 and/or the BIOS 304 and then pass back modified parameters, and that create facade virus target structures.

In some embodiments, the system 100 also includes a virus remover 316. As explained further below, the virus remover 316 relocates facade structures to their proper location, reconstructs boot sectors and MBRs, and otherwise removes viruses and repairs at least the main file system structures which were altered by the viruses. Some viruses guard themselves mainly against detection and are readily removed once detected, while other viruses actively resist removal by misdirecting attempts to reconstruct system structures. Thus, the virus remover 316 preferably uses the alternate BIOS 314 when removing a virus and its effects, but it may also use the regular BIOS 304.

Figure 4:
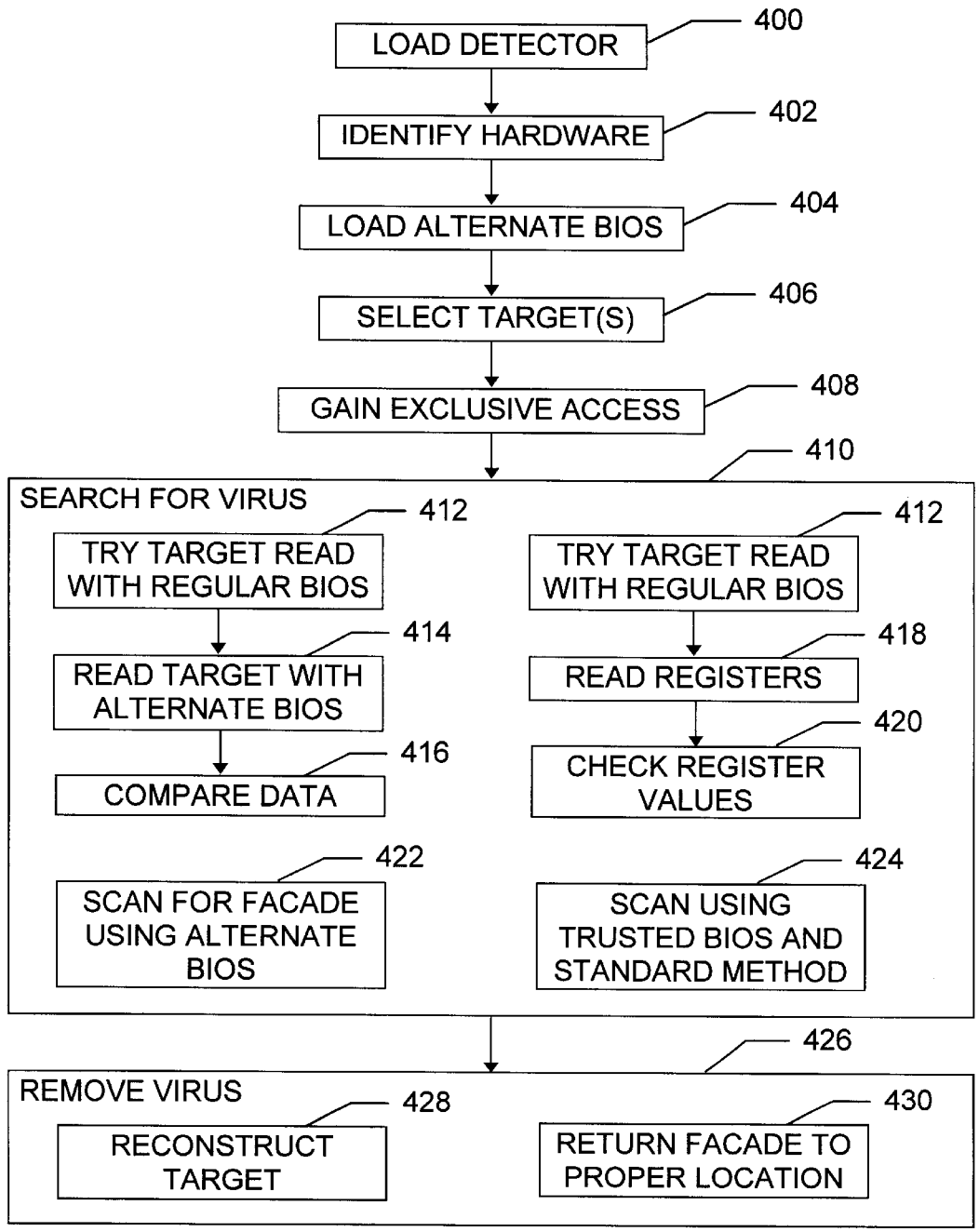
FIG. 4 is a flowchart illustrating methods of the present invention.

Methods of the present invention are illustrated in FIG. 4. The steps illustrated and discussed here may be performed in various orders, except in those cases in which the results of one step are required as input to another step. Likewise, steps may be omitted unless called for in the claims, regardless of whether they are expressly described as optional in this specification. Steps may also be repeated, as when several virus targets are selected for examination, or when several viruses are detected and removed.

One method starts with a loading step 400 which loads at least a portion of the virus detector software of the invention. The virus detector software may be loaded from a hard disk, a floppy disk, a network connection, or other source familiar to those of skill in the art.

During an identifying step 402, the loaded detector software reads CMOS registers, disk controller registers, or other familiar sources to determine which type or brand of controller 306 is present. The identifying step 402 may also determine whether multiple controllers 306 are present, and if so, identify each controller 402. In addition, the identifying step 402 may identify the operating system 302 being used, the file system(s) 302 being used, the other anti-virus software being used, and other components that may help focus the search or removal of particular viruses.

A loading step 404 loads one or more trusted BIOS components which are compatible with the hardware identified by the step 402. In an alternative embodiment, the detector software is tailored to specific hardware; the trusted BIOS for that hardware is loaded during the step 400 and the separate steps 402, 404 are omitted. As noted elsewhere, the present invention is not limited to IBM-compatible computers. Rather, the trusted BIOS translates between system software calls and storage hardware in PCs. workstations, mainframes, embedded systems, and other computers configured according to the invention.

During a step 406, one or more virus targets are selected for examination. Typical targets include the Master Boot Record, boot sectors, and other storage locations favored by viruses. Selection may be implicit in virus detector software embodying the invention, or targets may be selected interactively.

During a step 408, the virus detector software gains exclusive access to the storage medium 114, or at a minimum to the part of that medium 114 that holds the selected target(s). For instance, caching and virtual memory are disabled or properly restricted to prevent accesses that are not initiated by the virus detector software. In some embodiments, exclusive access is obtained by performing critical disk operations under a single-tasking operating system such as DOS instead of under a multi-tasking operating system such as Windows NT. In another embodiment, exclusive access is obtained by running virus detection software before the boot process initializes the virtual memory, caching, and task control subsystems of the operating system 302.

During a detecting step 410, the virus software searches for viruses, focusing on the selected targets but not necessarily limiting all activity to those targets. The search may proceed in one or more of the various ways shown and/or discussed. One search method includes an attempted target reading step 412, an alternate target reading step 414, and a data comparing step 416. During the attempted target reading step 412, the virus detector 312 reads the Master Boot Record or other target using the native BIOS 304 and/or the operating system 302. During the alternate target reading step 414, the virus detector 312 uses the detector's private BIOS 314 to read the same target. The data resulting from the two reads in then compared during the step 416.

If the regular BIOS 304 and the alternate BIOS 314 produce the same data, and if that data is what would be expected in an uninfected system, then the target is probably not infected. On the other hand, suppose the regular BIOS 304 produces the data expected in an uninfected system but the alternate BIOS 314 does not. The alternate BIOS 314 might not be correctly tailored to the controller 306. However, if the alternate BIOS 314 is correctly tailored to the hardware 306, then the target is probably infected; the regular BIOS 304 calls were probably redirected to a facade copy of the target data by a stealth virus which has just now been revealed by the invention.

Another search method includes the attempted target reading step 412, an alternate register reading step 418, and a register checking step 420. During the attempted target reading step 412, a disk read is forced to avoid receiving cached data During the register reading step 418, the virus detector 312 reads the hardware registers 308 directly to determine the channel, head, and sector or LBA last read. If the register values do not match the expected position of the Master Boot Record or other target during the checking step 420, then the read during step 412 was redirected to a facade target by a virus. Likewise, if during the step 420 the register values do not reflect the expected operation (e.g. read versus write), then a virus has performed an unauthorized operation.

Another search method scans for a facade target during a step 422. Some or all of the storage medium 114 can be read using the trusted BIOS 422. If a copy of the target is found at an unexpected location, that copy may be a facade placed by a virus. The virus may have already been removed, or it may still be present in the system 100.

Another search method uses virus detection techniques known to those of skill in the art during a step 424, but substitutes access through the trusted BIOS for access through the standard BIOS. More generally, the present invention improves many existing virus detection and removal techniques by removing their reliance on possibly infected system or BIOS software.

In some cases, the information gained during the searching step 410 may help identify the manner in which the virus works. For instance, suppose the step 412 produces a copy of the expected data using the regular BIOS 304, while the step 414 using the alternate BIOS 314 reveals that virus data is actually stored at the target's location. The disk read interrupt vector used by the regular BIOS 304 can be temporarily replaced to invoke the alternate BIOS instead. If this produces the same virus data, then the virus infiltration has occurred at the vector call level or above. For instance, the virus may have altered the interrupt vector.

Once a virus is discovered, the virus remover 316 may disinfect the computer 100 during a step 426. The removal steps used may depend on the type of virus detected. If a facade Master Boot Record or facade boot sectors are discovered, then they may be reconstructed in their proper location during a step 428 using redundant data. The redundant data may be stored elsewhere in the infected system 100, on another storage medium 114 in the system 100 or in another computer, in the virus detector 312, or in a combination of these places.

In particular, the redundant data may be stored at an improper location for use by the virus as a facade. In this case, the facade may be returned to its proper location during a step 430, possibly after a checksum or other test is used to verify the facade data's integrity with respect to its contents as opposed to its position.

Regardless of the redundant data's source, the redundant data is copied over the target area using the trusted BIOS 314. If the virus has altered interrupt vectors or other memory structures, then they may need to be reconstructed by rebooting the system 100. After rebooting the system 100, the searching step 410 may be repeated to determine whether the targets were successfully reconstructed.

It will be appreciated that a virus may infect more than one location in a computer. For instance, a virus may install itself both on disk and in memory. The removal step 426 may therefore include removing a virus from disk and then rebooting to remove the virus from memory. Alternatively, the step 426 may include removing the virus from disk and removing the virus from memory (by overwriting memory) without rebooting.

In summary, the present invention provides a virus detector which detects viruses that remain hidden when conventional approaches are tried. The invention provides an alternate path to disk. The alternate path can be used in place of an infected standard path, or it can be used in comparisons with a possibly infected standard path, to detect and/or remove viruses. The invention's detector uses a separate, trusted BIOS to detect viruses which alter the regular BIOS or system software and hide behind a facade boot sector or MBR to avoid detection. The invention also provides methods for removing viruses, and allows standard removal methods to be used in connection with the trusted BIOS. Some embodiments of the invention eliminate the need for a clean disk, thereby reducing the risk of re-infection.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, optical disks, magneto-optical disks, RAM, ROM, and other media readable by one or more of the computers. Each such medium tangibly embodies a program, functions, and/or instructions that are executable by the machines to perform virus detection and removal substantially as described herein.

Although particular methods embodying the present invention are expressly illustrated and described herein, it will be appreciated that apparatus and article embodiments may be formed according to methods of the present invention. Unless otherwise expressly indicated, the description herein of methods of the present invention therefore extends to corresponding apparatus and articles, and the description of apparatus and articles of the present invention extends likewise to corresponding methods. Unless otherwise stated, any list of included items is exemplary, not exclusive of other items; "includes" means "comprises" not "consists of."

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed is:

1. A computer system comprising:
    a storage subsystem including a storage medium and a controller, the controller having a controller interface for controlling access to the storage medium;
    a virus target structure stored on the storage medium;
    a translation means for translating between logical requests for access to the storage medium and corresponding parameters used in the controller interface; and
    a detection means for detecting a virus by detecting alteration of the correspondence between logical requests for access to the virus target structure and the corresponding controller interface parameters.

2. The system of claim 1, further comprising a means for removing a virus.

3. The system of claim 1, wherein the translation means includes a system BIOS and the detection means includes a separate trusted BIOS.

4. The system of claim 1, wherein the controller includes a disk controller.

5. The system of claim 4, wherein the storage medium includes a magnetic storage medium.

6. The system of claim 4, wherein the storage medium includes an optical storage medium.

7. The system of claim 4, wherein the storage medium includes a magneto-optical storage medium.

8. The system of claim 4, wherein the controller includes a floppy disk controller.

9. The system of claim 1, wherein the detection means includes means for detecting an altered copy of a BIOS.

10. The system of claim 1, wherein the detection means includes means for detecting an altered BIOS reference.

11. The system of claim 1, wherein the detection means includes means for detecting alteration of a BIOS parameter.

12. The system of claim 1, wherein the detection means includes means for detecting a facade system structure.

13. The system of claim 1, wherein the virus target structure includes a Master Boot Record.

14. The system of claim 1, wherein the virus target structure includes a boot sector which is not part of a Master Boot Record.

15. The system of claim 1, wherein the translation means includes an IBM-compatible BIOS.

16. The system of claim 1, wherein the translation means is part of Windows NT system software.

17. The system of claim 1, further containing a means for enabling use of the detection means across a network communications link.

18. A method for detecting a virus in a computer system, the computer system including system software, a storage medium, and an interface which provides the system software with access to the storage medium, the method comprising the steps of:
    providing a detector which can access the storage medium without using the interface by using an alternate path to the storage medium;
    using the detector to read a virus target; and
    analyzing the information read using the detector to determine whether the virus target is infected by a virus, by detecting alteration of a correspondence between logical requests for access to the virus target and corresponding controller interface parameters.

19. The method of claim 18, wherein the interface provides a first access path to the storage medium, and the detector provides a second access path to the storage medium.

20. The method of claim 19, wherein the analyzing step detects a virus by identifying an inconsistency between storage locations accessed using the two paths.

21. The method of claim 19, wherein the analyzing step detects a virus by identifying an inconsistency between operations performed when using the two paths.

22. The method of claim 18, wherein the using step modifies a standard virus detection method by substituting a use of the detector capable of directly accessing a disk controller register.

23. The method of claim 18, wherein the providing step provides a detector capable of directly accessing a disk controller register.

24. The method of claim 18, wherein the providing step provides a detector capable of directly accessing an interrupt vector table.

25. The method of claim 18, wherein the analyzing step includes comparing the information read using the detector with information obtained by attempting to read the virus target using the interface.

26. The method of claim 18, wherein the analyzing step includes comparing the information read using the detector with an expected virus target description which was obtained neither by using the interface nor by using the detector.

27. The method of claim 18, wherein the analyzing step includes using the detector to locate a facade copy of the virus target.

28. The method of claim 18, further comprising the step of removing a detected virus.

29. The method of claim 28, wherein the removing step includes relocating a facade virus target.

30. The method of claim 28, wherein the removing step includes reconstructing a Master Boot Record.

31. A computer storage medium having a configuration that represents data and instructions which will cause at least a portion of a computer system to perform method steps for detecting a virus, the method steps comprising the steps of claim 18.

32. The storage medium of claim 31, wherein the method steps comprise the steps of claim 20.

33. The storage medium of claim 31, wherein the method steps comprise the steps of claim 21.

34. The storage medium of claim 31, wherein the method steps comprise the steps of claim 22.

35. The storage medium of claim 31, wherein the method steps comprise the steps of claim 23.

36. The storage medium of claim 31, wherein the method steps comprise the steps of claim 27.

37. The storage medium of claim 31, wherein the method steps comprise the steps of claim 28.

* * * * *